(12) United States Patent
Chan et al.

(10) Patent No.: US 8,016,570 B2
(45) Date of Patent: Sep. 13, 2011

(54) GAS COMPRESSOR WITH DRIER AND RADIO EMISSION CONTROLS

(75) Inventors: Anthony Chan, North York (CA); Ralph Rackham, Toronto (CA); Tome Mojsov, Toronto (CA); Tracey Demaline, Milton (CA); Filip Antanassov, Oakville (CA)

(73) Assignee: MTM S.R.L., Cherasco (CN) (IT)

( * ) Notice: Subject to any disclaimer, the term of this patent is extended or adjusted under 35 U.S.C. 154(b) by 1132 days.

(21) Appl. No.: 10/530,247

(22) PCT Filed: Oct. 6, 2003

(86) PCT No.: PCT/CA03/01474
§ 371 (c)(1),
(2), (4) Date: May 7, 2007

(87) PCT Pub. No.: WO2004/030794
PCT Pub. Date: Apr. 15, 2004

(65) Prior Publication Data
US 2007/0231160 A1 Oct. 4, 2007

(30) Foreign Application Priority Data
Sep. 9, 2003 (CA) .................................. 2440255

(51) Int. Cl.
*F04B 41/00* (2006.01)
*F04B 19/04* (2006.01)
*F26B 19/00* (2006.01)
(52) U.S. Cl. ............ 417/238; 417/236; 417/313; 34/78; 34/90
(58) Field of Classification Search ............... 417/236, 417/238, 244, 254, 265, 313, 902; 141/85; 34/78, 90
See application file for complete search history.

(56) References Cited

U.S. PATENT DOCUMENTS

| | | | | |
|---|---|---|---|---|
| 4,964,788 A | * | 10/1990 | Itameri-Kinter et al. | 417/422 |
| 4,966,206 A | | 10/1990 | Baumann et al. | 141/83 |
| 5,029,622 A | | 7/1991 | Mutter | 141/4 |
| 5,263,826 A | | 11/1993 | Baumann et al. | 417/310 |
| 5,506,486 A | * | 4/1996 | Hayashi et al. | 318/808 |
| 6,117,211 A | * | 9/2000 | Chan et al. | 95/120 |
| 6,220,052 B1 | * | 4/2001 | Tate et al. | 62/613 |
| 6,221,130 B1 | * | 4/2001 | Kolodziej et al. | 95/41 |
| 2003/0155739 A1 | * | 6/2003 | Keefer et al. | 417/422 |

FOREIGN PATENT DOCUMENTS

| | | |
|---|---|---|
| EP | 0 799 635 | 10/1997 |
| WO | WO 01/78872 A2 | 10/2001 |

* cited by examiner

*Primary Examiner* — Charles G Freay
*Assistant Examiner* — Patrick Hamo
(74) *Attorney, Agent, or Firm* — Nawrocki, Rooney & Sivertson, P.A.

(57) ABSTRACT

A gas compressor unit according to the invention includes a single gas desiccant bed and condenser (which is inactive during the compression stage) inserted into the gas flow path of the compression cycle. In the case of a multistage compressor, the single gas desiccant bed is inserted between preferably the first and second stages. Moisture absorbed into this bed is periodically removed by exposing the bed to a regeneration cycle. The regeneration cycle employed is based on the closed re-circulation of gas present in the compressor and the desiccant bed itself, as well as other gas present in the re-circulation loop when the unit suspends delivery of compressed gas. Moisture removed from the desiccant bed is condensed and preferably evaporated into the environment through a semipermeable membrane. The motor and motor controller are located with the compressor in a common casing to minimize electromagnetic emissions.

11 Claims, 9 Drawing Sheets

GAS COMPRESSOR WITH DRIER AND RADIO EMISSION CONTROLS

CROSS-REFERENCE TO RELATED APPLICATIONS

This application claims priority of PCT/CA2003/001474 filed on Oct. 6, 2003, which claims priority of U.S. patent application Ser. No. 10/265,096, filed Oct. 4, 2002 and Canadian Patent Application No. 2,440,255 filed Sep. 9, 2003.

FIELD OF THE INVENTION

This invention relates to the compression of gases. More particularly, it relates to the compression of natural gas and/or hydrogen for use in vehicles propelled by such gases. Specifically, it relates to an apparatus and methods for removing moisture vapor as part of the compression procedure and separating removed moisture from contaminants therein. It also relates to minimizing the release of electromagnetic radiation.

BACKGROUND OF THE INVENTION

It is known to remove moisture from gas in order to store such gas for use in a motor vehicle. Moisture is also removed from compressed gases for a variety of other applications. Typically, during the gas compression cycle the gas being compressed is passed over a desiccant bed which effects the removal of moisture from the gas. Eventually, the desiccant bed will saturate. A moisture sensor may be employed to detect the amount of moisture present in the gas exiting the compressor, sensing when the measured moisture content at the output of the compressor rises beyond a permissible range, above an upper limit. Alternately, a drying bed may be employed for a predetermined period of time. In either case a regeneration stage for recharging the desiccant bed is eventually required.

The technology for drying gas streams is well established. It includes absorption and condensation methods and the use of membrane separation systems. Examples of these technologies, used separately and in combination are U.S. Pat. Nos. 5,034,025; 5,071,451 and 5,240,472 as well as the prior art referred to therein.

Existing compressors of this type have employed gas drying arrangements that operate on a continuous basis, using a two-bed system. Examples of this type of technology include U.S. Pat. No. 6,117,211.

The present invention addresses the object of compressing natural gas with a reduced amount of moisture being present in the compressed gas by employing gas drying arrangements that operate on a dis-continuous basis, using a single-bed system wherein the compression of gas is eventually interrupted to allow the system to effect regeneration.

In the treatment of gas streams, de-watering processes generate extracted water that may contain traces of contaminants originating from the principal stream. In the case of natural gas, these contaminants include hydrogen sulphide, sulphur dioxide and mercaptans. Disposal of water containing contaminants of this type can be subject to environmental restraints.

The extracted water being produced cannot be released locally into the environment because of the contaminants present therein. Apart from issues relating to hazards, even trace smells of organic or sulphurous components from a natural gas stream would suggest to a consumer that a leak existed in the compressor system.

It is an object of this invention to address the convenient disposal of separated water under these circumstances.

It is a further object of this invention to minimize the release of electromagnetic radiation during operation of the compressor system.

The invention in its general form will first be described, and then its implementation in terms of specific embodiments will be detailed with reference to the drawings following hereafter. These embodiments are intended to demonstrate the principle of the invention, and the manner of its implementation. The invention in its broadest and more specific forms will then be further described, and defined, in each of the individual claims which conclude this Specification.

SUMMARY OF THE INVENTION

According to the present invention in one aspect, a compressor for a gas which normally operates on a gas compression cycle is provided with a gas drier stage comprising a single desiccant bed located in-line with the flow of gas passing through the compressor during the gas compression cycle. Also located in-line with such gas flow is a condenser which, during the compression cycle, is inactive. The temperatures of the desiccant bed and condenser are both controllable, preferably by electrical means. During the compression cycle, such temperature controls are preferably inactive. However, upon entering into a regeneration cycle, the gas bed is heated and the condenser is cooled.

During the regeneration cycle arising from activation of a valve means, gas trapped within the compressor, desiccant bed and condenser is redirected from the outlet of the compressor for circulation in a closed loop as a recirculating gas flow through the compressor, with at least a portion of such recirculating gas passing through the desiccant bed and condenser. This permits water evolved from the desiccant bed to be carried by the recirculating gas to the condenser where it condenses due to the low temperature condition maintained within the condenser by the temperature control means.

More specifically, in a preferred embodiment the outlet from the compressor is connected through an electronically controlled valve to the delivery line which carries compressed gas off to a storage reservoir during the compression cycle. When the compressor ceases operating in compression mode, the electronically controlled delivery valve switches the flow of gas from the delivery line into the interior volume of a casing cavity for the compressor. The compressor draws its input from the casing cavity.

The resulting drop of pressure in the delivery line causes a check valve at the external reservoir, which contains high pressure gas, to close. The compressed gas trapped in the delivery line then "blows down" into the interior volume of the casing, producing a pressure condition that is moderately elevated above that of the supply line pressure eg 30-60 psi. The check valve at the supply line inlet to the interior volume then closes as the source gas pressure is only of the order of 0.2 to 0.5 psi.

With output of the compressor redirected into the casing volume, the trapped gas is now capable of circulating in a closed loop through the compressor, desiccant bed, condenser, and casing volume with the trapped gas serving as a sweep gas for regenerating the desiccant bed. Circulation of the gas within this closed loop is effected at a low gas flow rate so that the circulating gas passing through the condenser is substantially, preferably fully, chilled when it exits the condenser. This maximizes the efficiency of transferring moisture from the desiccant bed to the condenser as a preferred mode of operation.

Circulation may be effected at a low flow rate by reducing the speed of the compressor motor. Alternately, one or more valve-controlled bypass lines may divert a portion of the circulating gas around the desiccant bed, and/or the condenser, allowing only a limited amount of gas flow through these components. The permitted flow rate over the bed, established by the valve or by other flow-limiting means, is set so as to be commensurate with the condensation of vapor from such gas. This arrangement allows the system to operate with a fixed speed motor.

In the regeneration process water evolves from the desiccant bed, raising the moisture content of the circulating gas. The desiccant bed is heated at this stage to enhance its release of moisture. The released water, in vapor form, is then carried by the gas flow to the condenser where it condenses due to the low temperature condition maintained within the condenser. Circulating gas exiting the condenser leaves the condenser in a cooled, vapor saturated, condition. By the time the circulating gas reaches the heated desiccant bed, its temperature has been raised and the gas is no longer vapor saturated. The heated circulating gas is therefore able to absorb further moisture from the desiccant bed as it passes over such bed.

In order to dispose of water condensing within the condenser such water may simply be collected. However, to achieve extended, stand-alone operation, the condensed water is directed, preferably flowing under gravity, into contact with a semi-permeable membrane which allows the water to evaporate. At the same time, aromatic compounds present within the condensate are retained by the membrane within the condenser. To enhance the rate of evaporation and flow of water through the semi-permeable membrane, an external fan and optional heater element may be preferably positioned to circulate warm air past the membrane surface.

It is important to note that the condenser, according to the invention, is located in-line with the gas flow during the compression cycle. This exposes the condenser and semipermeable membrane to an elevated pressure condition. In a preferred variant of the invention, the compressor is a multistage compressor and the desiccant bed and condenser are positioned in-line between consecutive stages, preferably between the first and second stages of the compressor. Thus, although the condenser is exposed to an elevated pressure condition, this is not the final, maximum pressure produced by the compressor. Rather, it is an intermediate pressure arising after only the first stage of compression.

This limitation on the pressure to which the condenser is exposed is particularly significant in the preferred embodiment of the invention wherein the condenser is directly connected to a semi-permeable membrane through which condensed water is allowed to evaporate into the environment. Such membranes are only capable of withstanding a modest pressure differential. In the case of a multistage compressor, the pressure developed between the first and second stage is not so high as to preclude use of such a semi-permeable membrane as a means to dispose of water condensate. A preferred form of membrane is tubing made of Hydroscopic Ion Exchange Membrane.

Thus, according to this preferred embodiment, condensed water accumulating in the condenser is directly, or eventually, disposed of by release into the environment, preferably through the semi-permeable membrane. Use of such a membrane ensures separation and retention of complex odorous molecules that may be present in the water condensate, with only pure water being released into the environment.

Once the desiccant bed has been recharged, heating for the bed is terminated. As well, chilling of the condenser and heating for the semi-permeable membrane, if employed, are terminated. Thereafter the valve means is actuated to reconnect the outlet stage of the compressor to the delivery line. The compressor motor is then speeded up to resume the compression cycle if it has been slowed down, and the inlet to the supply line automatically reopens. Alternately, if a fixed speed motor is employed, the bypass lines is/are closed-off allowing the regular compression cycle to resume.

In a further preferred variant, the compressor is contained within a sealed metal casing. Supply gas enters the interior volume of this casing through a check valve and is drawn into the compressor from the crank-portion of this interior volume. Also located within the casing is the motor, preferably a variable speed motor, and preferably control circuitry for delivering current to the motor. In these preferred scenarios, the motor is an alternating current induction motor, and in the variable speed situation the control circuitry produces an alternating current of varying frequency, whereby the speed of the motor is varied in accordance with system requirements.

It is a further preferred feature of the invention that not only is the electrical motor operating the compressor mechanism contained within the same casing as the compressor, but also the control circuitry for delivering power to the motor is contained within the casing. An advantageous result achieved by this arrangement is that electromagnetic emissions arising from current being delivered from the motor controller to the motor are confined within the metallic casing.

The control circuitry, which may deliver current at 360 volts DC to the motor, is itself provided with current through a sealed penetration of the casing wall. The motor control circuitry operates to create alternating current having a frequency of on the order 60 Hz but with multiple harmonics. The electrical power delivered to the motor provides current, at a typical maximum level, of on the order of 8 to 10 amps. The electromagnetic radiation from the wiring extending between the control circuitry of the motor carrying a such current at such frequencies is a source of electromagnetic radiation. By confining this wiring to within the metallic casing, electromagnetic radiation from this source is shielded from entering into the environment.

On start-up, low motor speeds are preferably adopted to reduce otherwise high start-up current drains on the electrical supply system. This enables the unit to operate off of a standard household voltage, e.g. 110-120 volt, moderately fused electrical supply system. After start-up, initial compression can be effected with a high motor speed. Once higher pressures have been established in the motor vehicle fuel reservoir or other delivery receptacle, the motor speed is reduced in order to moderate ring wear and limit power consumption. This procedure is especially suited to oil-less compressors as the wear rate of the sealing rings within the compressor cylinders of such units increases when the compressor system is operated at high speed against a high-back pressure.

Furthermore, use of a continuously controllable, variable speed motor, allows setting the speed of the motor to avoid natural resonant frequencies arising from the mechanical components. Such resonant frequencies may increase the noise and vibration generated by the unit.

The foregoing summarizes the principal features of the invention and some of its optional aspects. The invention may be further understood by the description of the preferred embodiments, in conjunction with the drawings, which now follow.

DESCRIPTION OF THE PREFERRED EMBODIMENT

Figure 1:
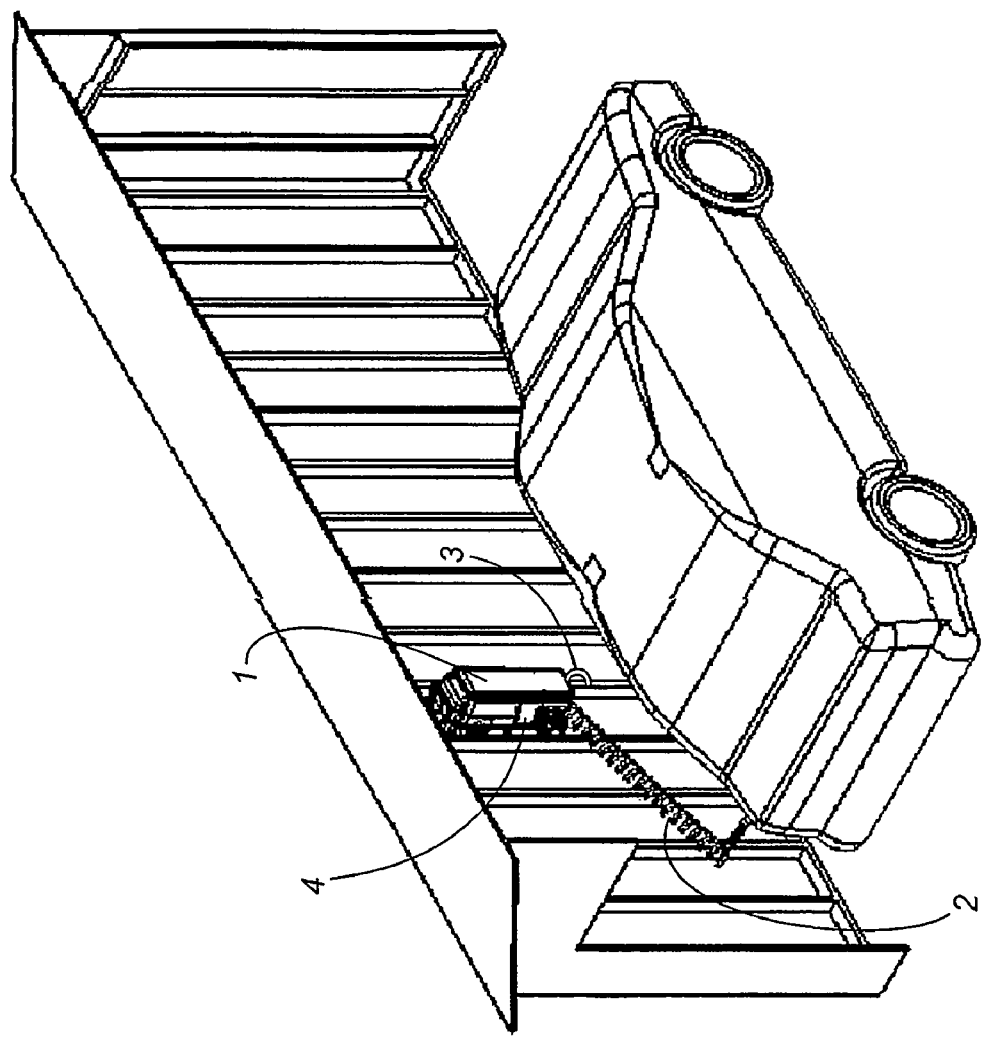
FIG. 1 is a pictorial representation of a gaseous fuel motor vehicle parked in a garage having a home refueling appliance according to the invention mounted on its inner wall.

In FIG. 1 the home refueling appliance 1 is shown mounted on a garage wall with the high-pressure discharge or delivery hose 2 connected to a car, the inlet or supply hose 3 providing a source of gas 6, and the electrical cord 4 plugged into a standard household receptacle.

Figure 2:
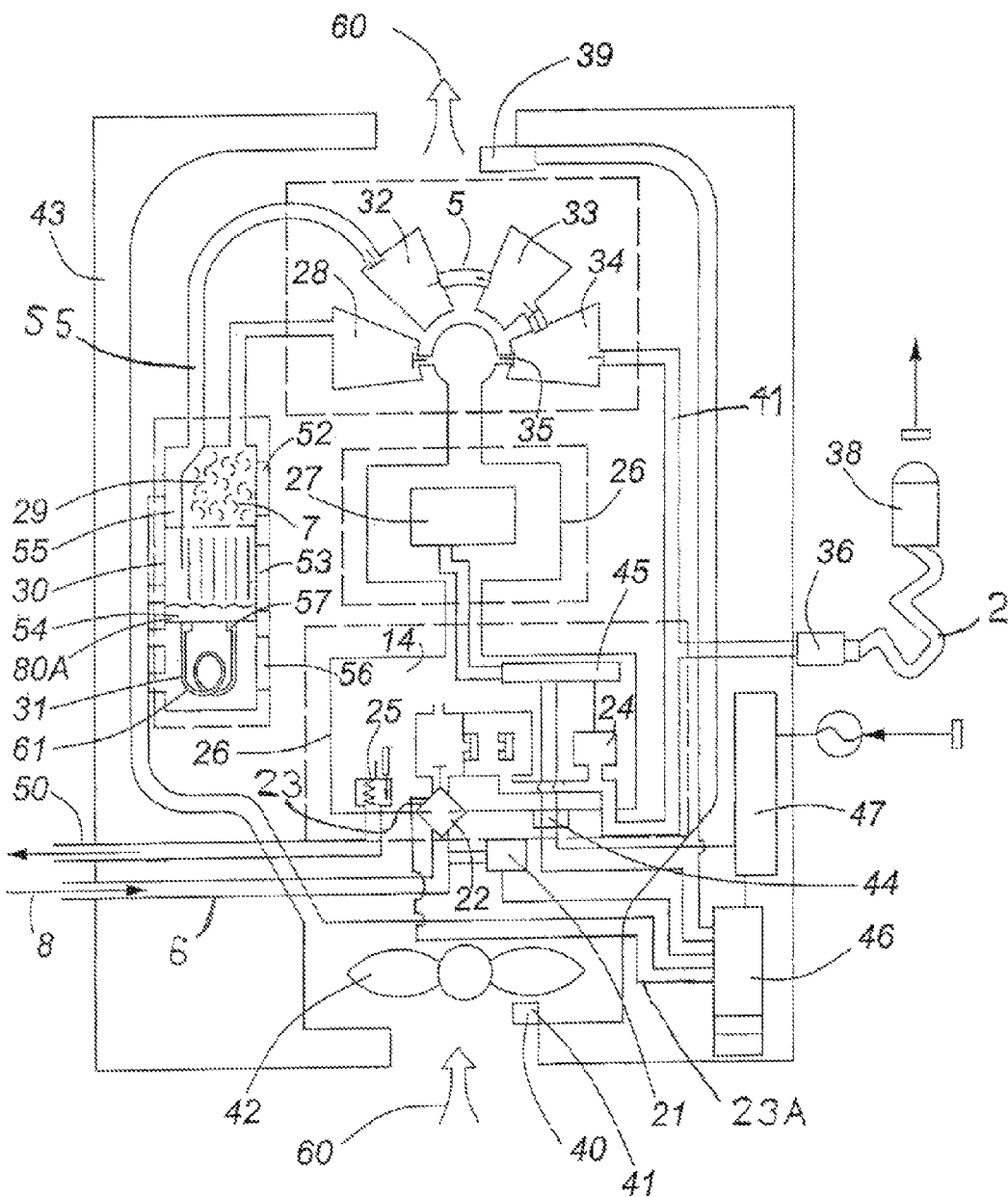
FIG. 2 is a schematic for the basic components of the appliance showing besides the motor and compressor, the desiccant bed, the main logic controller, the motor control circuitry and various sensors.

FIG. 2 schematically depicts the unit operating in compression mode. In FIG. 2 line gas which may contain contaminants 8, enters the interior volume 14 of the casing 26 from a gas supply inlet connected to an inlet of a filter 22 and a supply valve 23 by a duct 6. The line gas flows from valve 23 through casing 26 into the first of a series of four compression stages 28, 32, 33, 34 of compressor 5. The line gas, which typically has a pressure of between 0.2 and 0.5 psi is drawn into the interior volume 14 by the suction created by the first compression stage 28. During the compression mode, supply valve 23 main controller 46 provides a control signal on path 23A to valve 23 holding valve 23 open. A line gas pressure sensor 21 detects the line gas pressure, providing a signal to the main logic controller 46.

Figure 3:
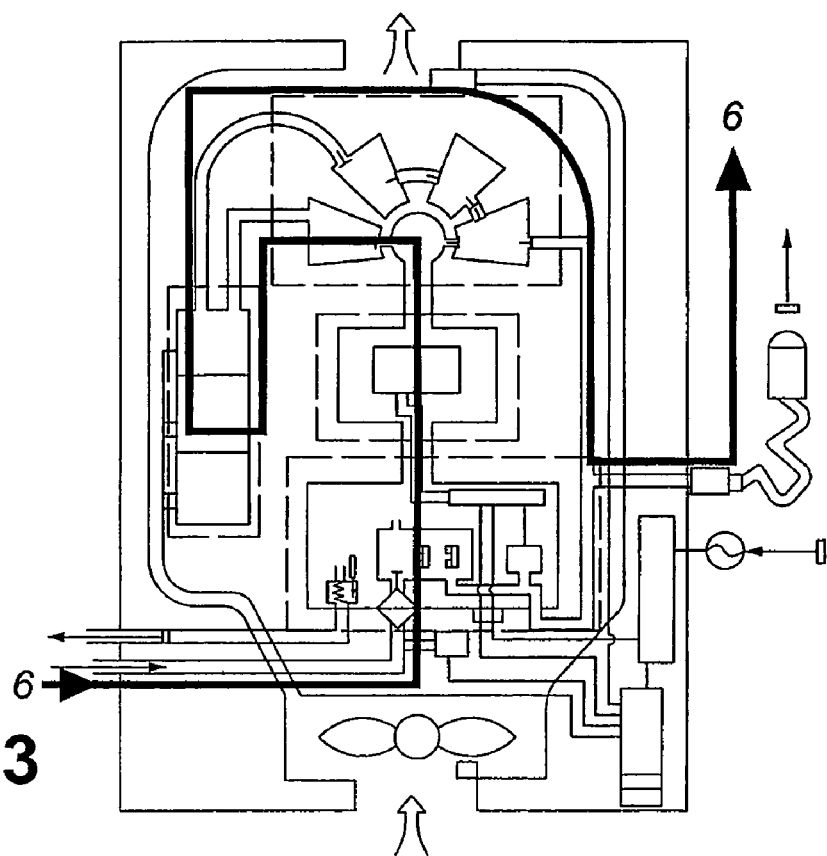
FIG. 3 is a schematic variant of FIG. 2 showing gas flow during the compression cycle.

On leaving the first stage 28, the gas 6 passes through a desiccant bed 7 contained within an absorption chamber 29. This bed of desiccant material 7, such as activated alumina or zeolite, adsorbs the moisture in the gas 6, including at least some of the contaminants 8. Upon exiting the absorption chamber 29, the dried gas continues into the volume of a condenser 30 which is, at this stage, passive. Exiting the condenser 30 through conduit 55, the gas 6 proceeds to the next, second stage 32 of the compressor 5. The flow of gas in this compression cycle is shown in FIG. 3. Gas pressure increases in each of the compressor stages 32, 33, and 34. Pressurized gas from stage 34 flows through duct 41 to hose 2 and a nozzle 38. As is true for all fuel delivery nozzles, nozzle 38 has an integral valve to allow flow of gas only when connected to a vehicle.

Figure 4:
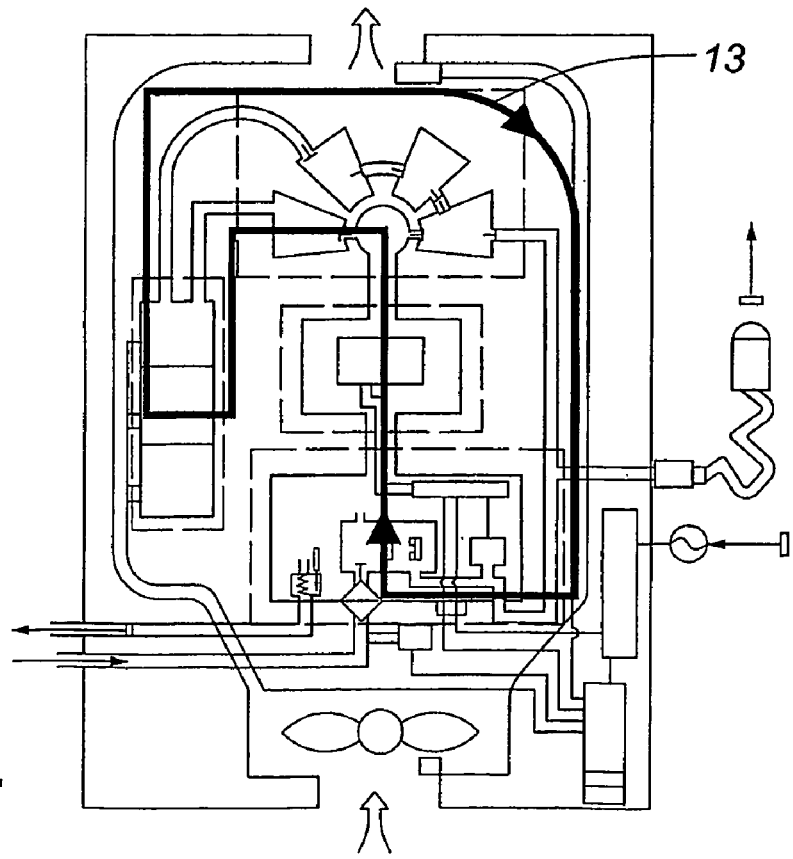
FIG. 4 is a schematic as in FIG. 2 showing the basic flow diagram of the appliance during the regeneration cycle wherein the desiccant bed is recharged and the motor speed is variable.
Figure 5:
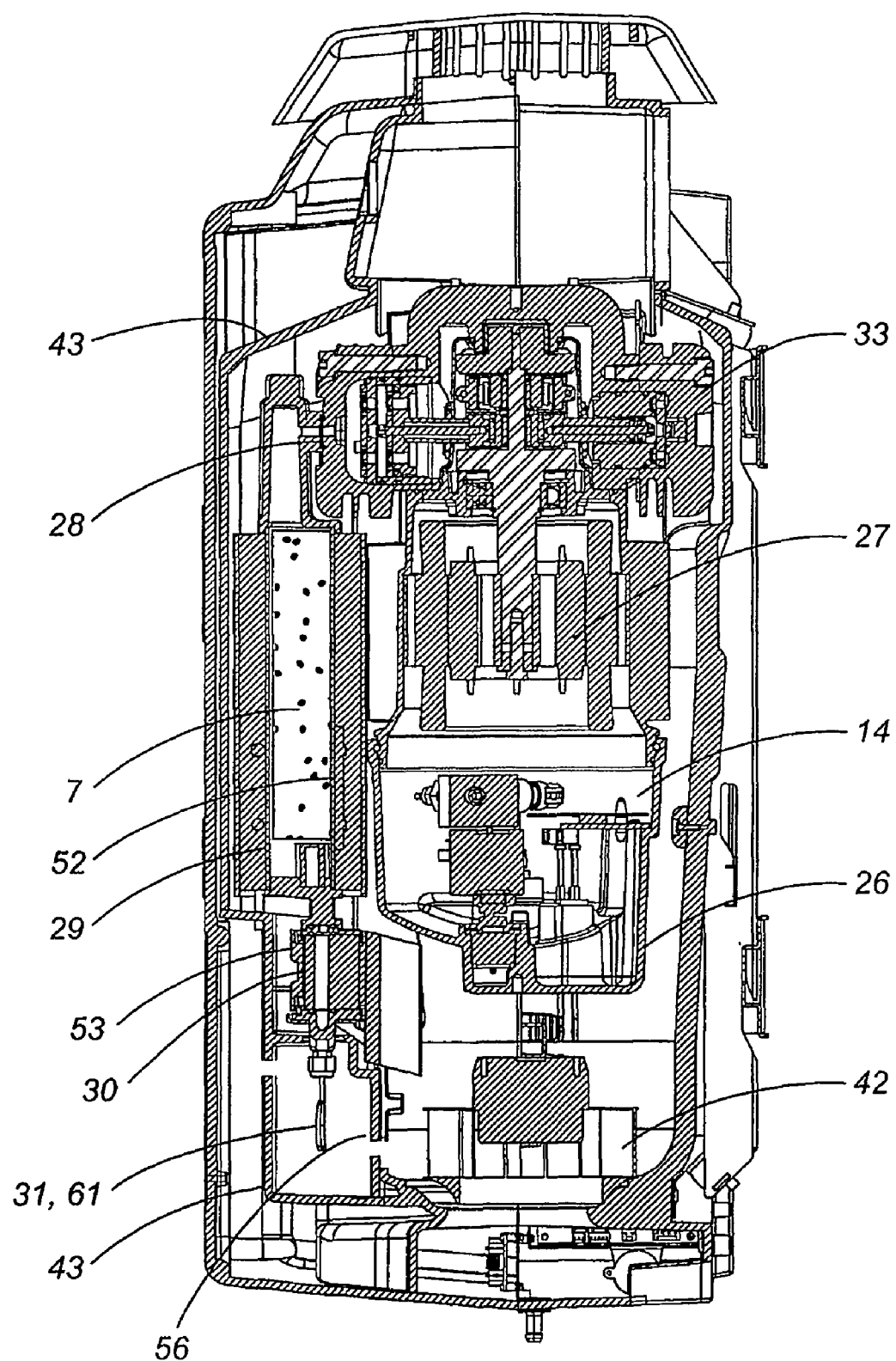
FIG. 5 is a cross-sectional side view of the compressor/motor assembly within its immediate case and the drier components. This compressor casing contains the motor, a blow-down volume, and the motor control circuitry. Also shown is an additional, outer case or ventilation shroud to contain cooling air flow.
Figure 6:
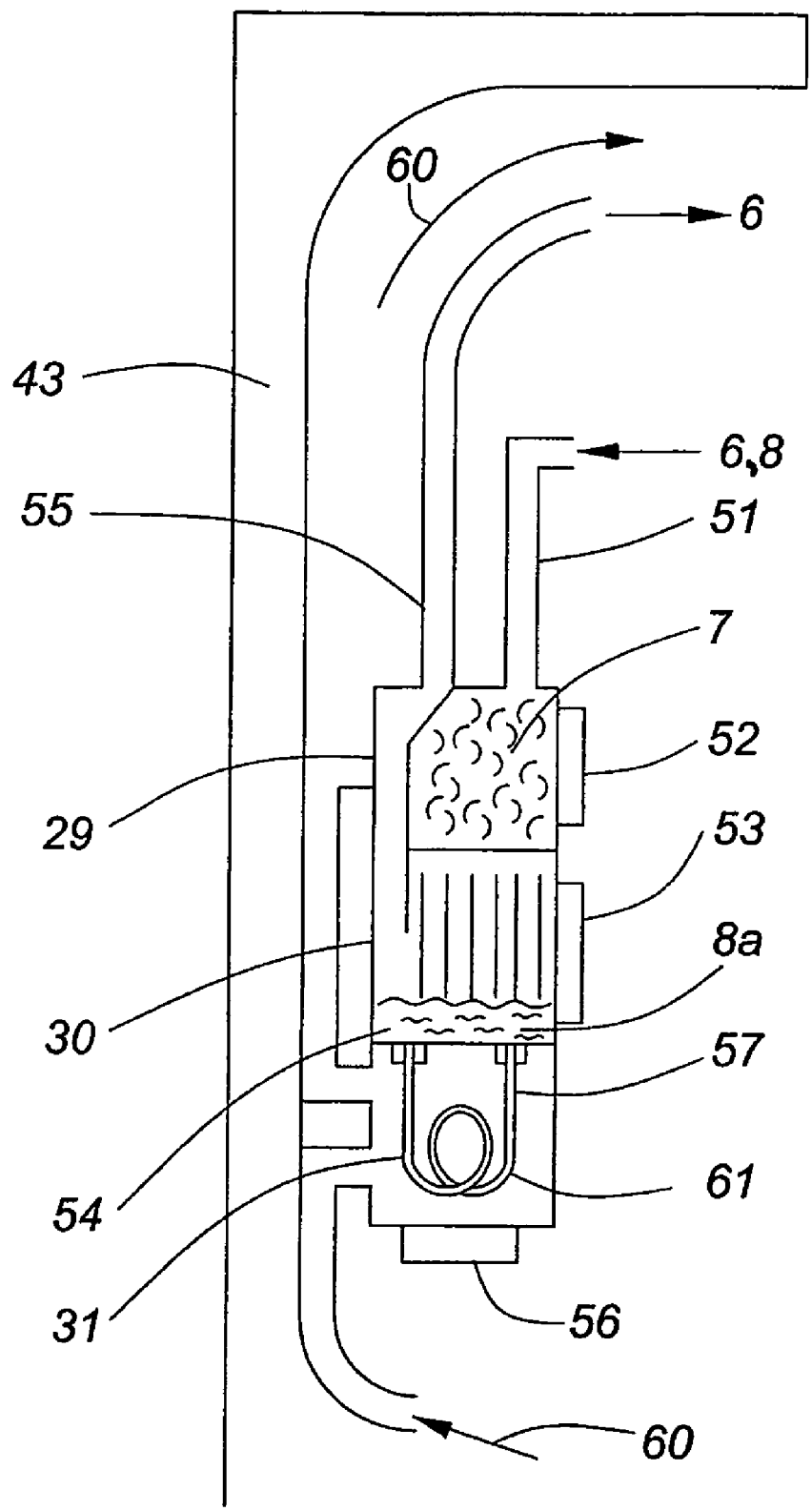
FIG. 6 is a detailed schematic cross-sectional front view of the drier, condenser, and semi-permeable membrane portions of FIG. 2 with the semi-permeable membrane in the form of a tube through which water condensate enters under gravity.
Figure 6A:
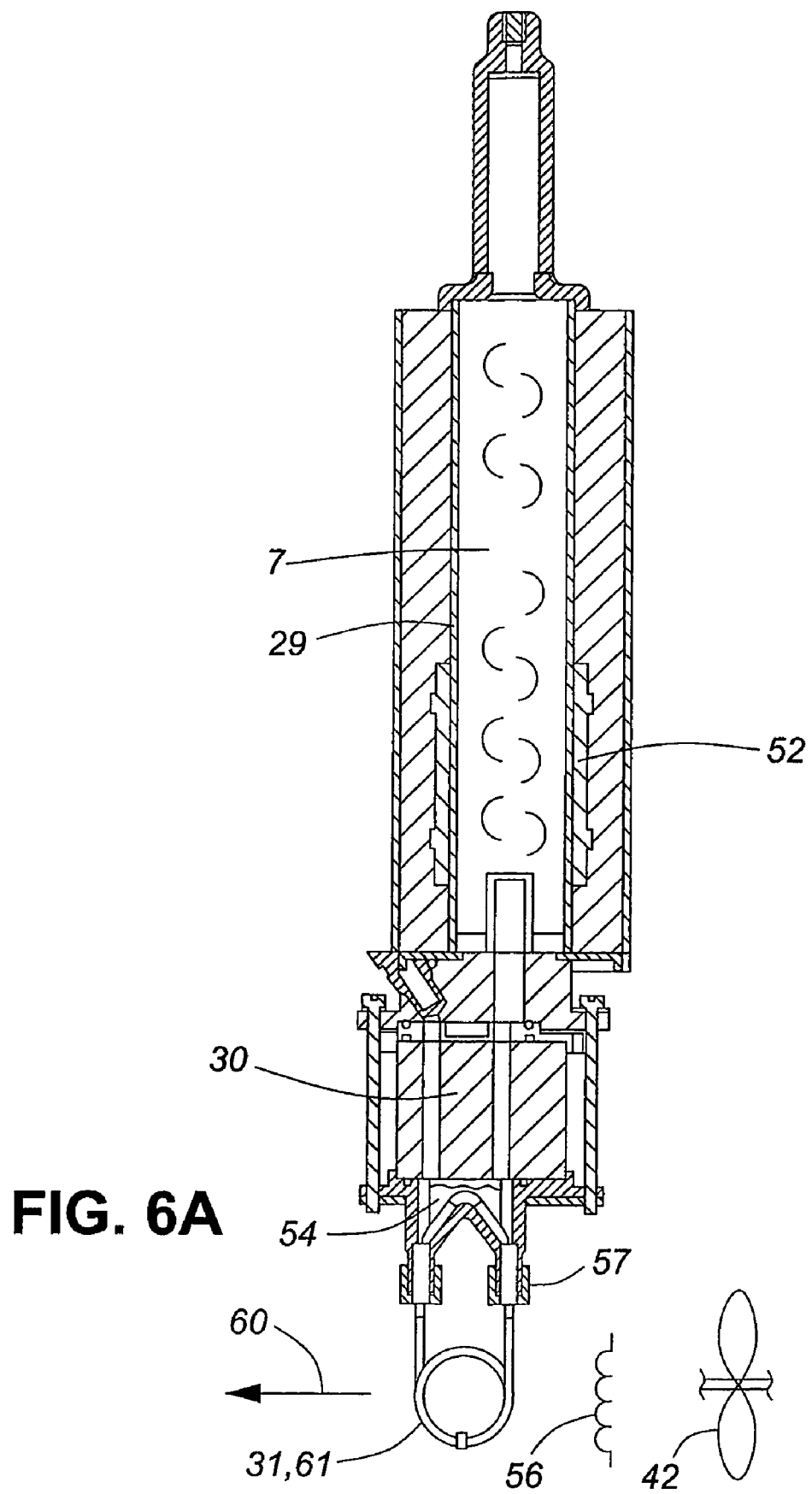
FIG. 6A is a cross-sectional front view of the drier, condenser, and semi-permeable membrane portions of FIG. 6 showing the semi-permeable membrane tube through which water condensate evaporates in the presence of a heated airflow created by a fan.

As shown in FIG. 4, and in greater detail in FIGS. 6 and 6A, the desiccant 7 is regenerated by exposure to a sweep gas 13 originating from the gas stream trapped in the compressor 5, motor 27, desiccant bed 7 and condenser 30 when the compression cycle is terminated. During the regeneration mode, controller 46 provides a control signal on path 23A causing valve 23 to close. As shown in FIG. 4 the sweep gas 13 is drawn at a reduced flow rate through the absorbent bed 7, optionally by the slow speed operation of the change to motor 27. Moisture in the adsorbent bed 7 is encouraged to vaporize into the sweep gas 13 by its dry condition, as described further below, by its pressure and the by the additional supply of heating to the absorbent bed 7.

Upon exiting the bed 7 the gas flows into condenser 30 which contains a heat-exchange surface. This heat-exchange surface is preferably cooled by an electrically operated cooling block 53 using the Peltier effect.

Cooled, circulating sweep gas 13, which has now been de-moisturized in the condenser 30, then passes into a return conduit 55 that leads to the second stage 32 of the compressor. Sweep gas 13 then flows to the third compressor stage 33 and the fourth compressor stage 34, and then through duct 41 to interior volume 14. The slow operation of the motor 27 and compressor 5 causes this sweep gas 13 to circulate endlessly until the regeneration cycle is terminated.

To speed the regeneration process and assist in recovery of the water subsequently, a thermostatically controlled electrical element 52 warms the desiccant 7. The warmed, moisturized sweep gas more effectively releases moisture as it passes through the condenser 30.

As shown in FIGS. 2, and 6 liquified water 54 accumulates in the bottom of the condenser 30 as a condensate, below the level of the return conduit 55 within the condenser. The condensed water 54 will contain some residual contaminants 8a. This water condensate 54, including residual contaminants 8a present therein, may be simply accumulated and collected or it may then be passed to a separation chamber preferably in the form of tubing 31 that has walls formed of a semi-permeable membrane 61. The semi-permeable membrane 61 allows only the penetration of water as the permeate. On the other side of the membrane 61, water diffusing therethrough evaporates. This process may be accelerated by an airflow originating from a fan 42. In this case the shroud 43 serves to duct a constant air flow over the membrane 61. Optionally the air flow in the vicinity of the membrane may be heated by a membrane heater 56.

The circulating airflow 60 from the fan 42 may also be used to cool the condenser 30, preferably using separate ducting (not shown).

As water diffuses through the membrane 61, some contaminants 8a may accumulate on the interior surface of the membrane 61. Eventually, the rate of diffusion may drop to a level where the membrane 61 must be cleaned or replaced.

Figure 7:
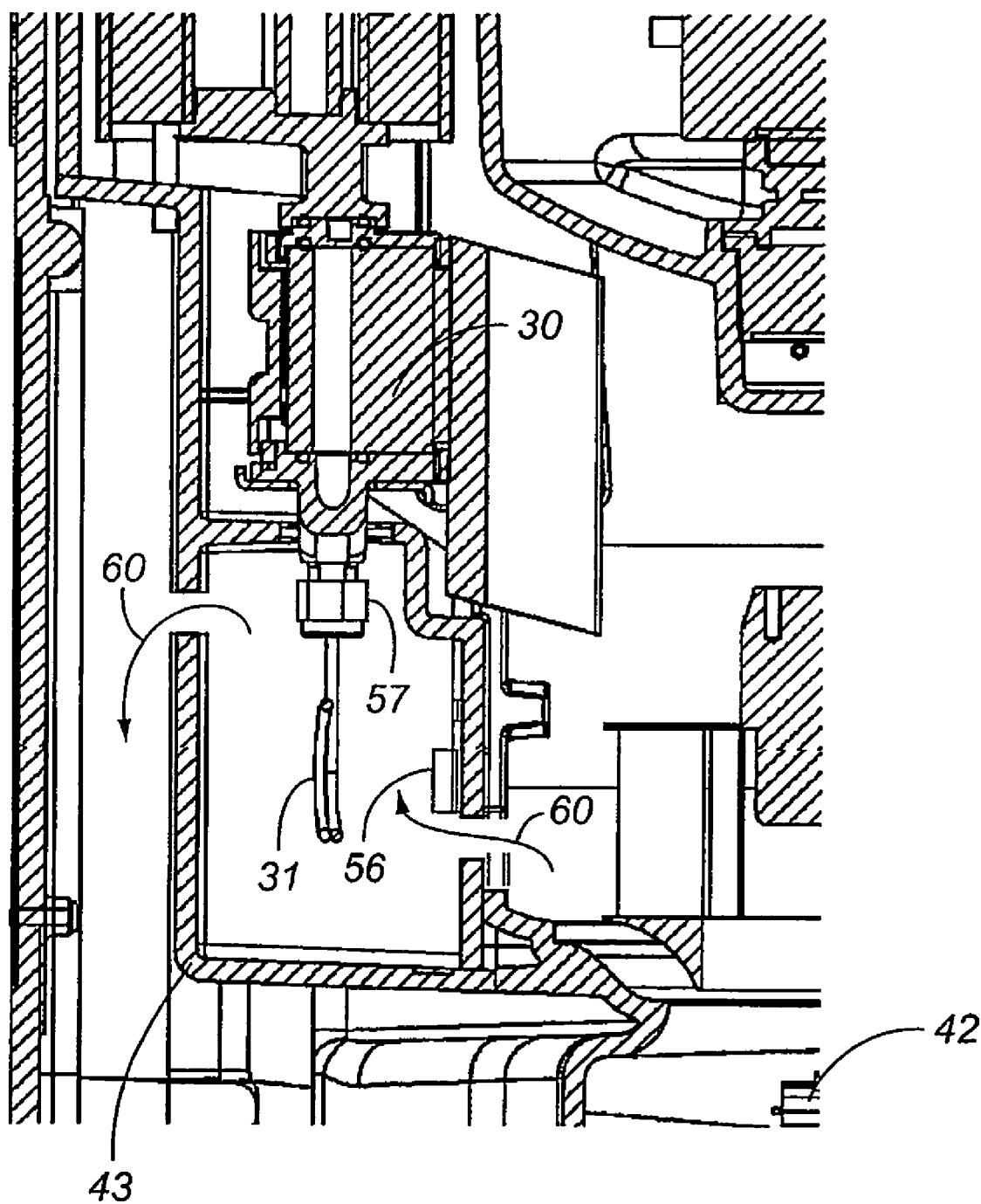
FIG. 7 is a detailed, close-up, cross-sectional side view of the semi permeable membrane of FIGS. 5 and 6a showing airflow around the coiled tubing.

In the foregoing description the semi-permeable membrane 61 could be in the form of a plate fitted as part of a wall of a separation chamber. FIGS. 6 and 7 show a preferred variant in which the semi-permeable membrane is shown as a tube 31. This tube 31 is preferably has a wall formed of semi-permeable hydroscopic ion exchange membrane material. Membranes in the form of tubes made of modified Teflon™ have been found suitable for this application, showing life-times of practical duration.

It is noted that the absorbent chamber 29 and condenser 30 are contained within the high pressure zone of the compressor 5, between the first stage 28 and the second stage 32. The pressure in this zone is only on order of 200 psi during the compression cycle. In fact, this pressure level enhances the gas drying effect. It has been found that, at these pressure levels, the semi-permeable membrane 61 in tubing format can extend outside this pressurized zone, relying on secure couplings 57 to seal the connection between the tubing 31 and the condenser chamber 30. The use of the multistage compressor especially facilitates this arrangement.

Further components as shown in FIG. 2 include an inlet filter 22, a high pressure transducer 24, a pressure relief valve 25 leading to a vent opening 50, a burst disc 35 in the fourth stage 34 to relieve excessive over-pressure, an in-line breakaway connector 36, the vehicle connection nozzle 38, a gas leak-detecting sensor 39, an air flow sensor 40, and an ambient air temperature sensor 41.

Figure 8A:
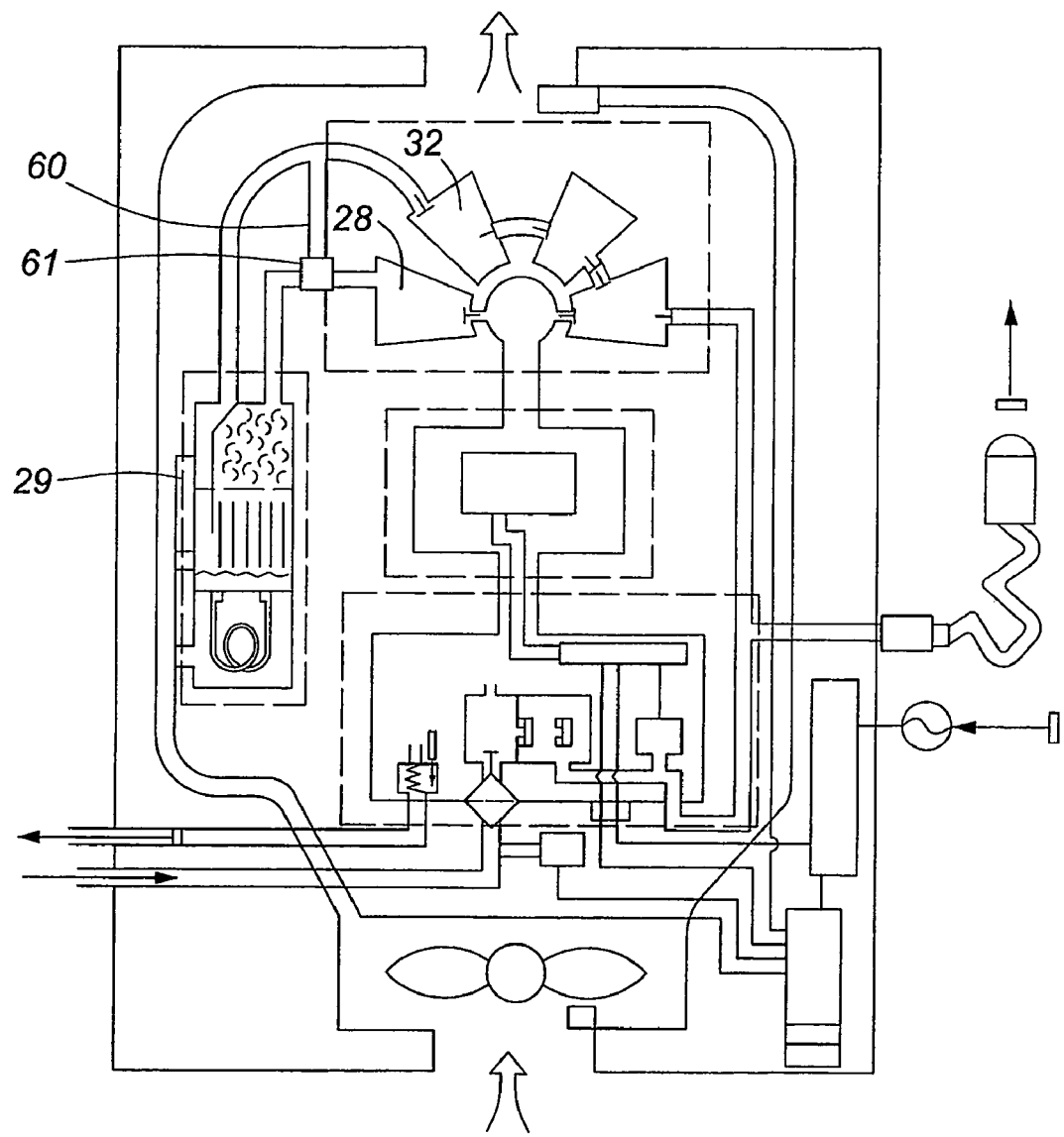
FIGS. 8A and 8B are schematics as in FIG. 2 showing the basic flow diagram of the appliance during the regeneration cycle wherein the motor speed is fixed and the drier-condenser has a bypass line that can divert flow past the drier-condenser by switching flow into the circulating loop or to the casing cavity, or both, to permit a reduced gas flow rate to occur within the condenser.
Figure 8B:
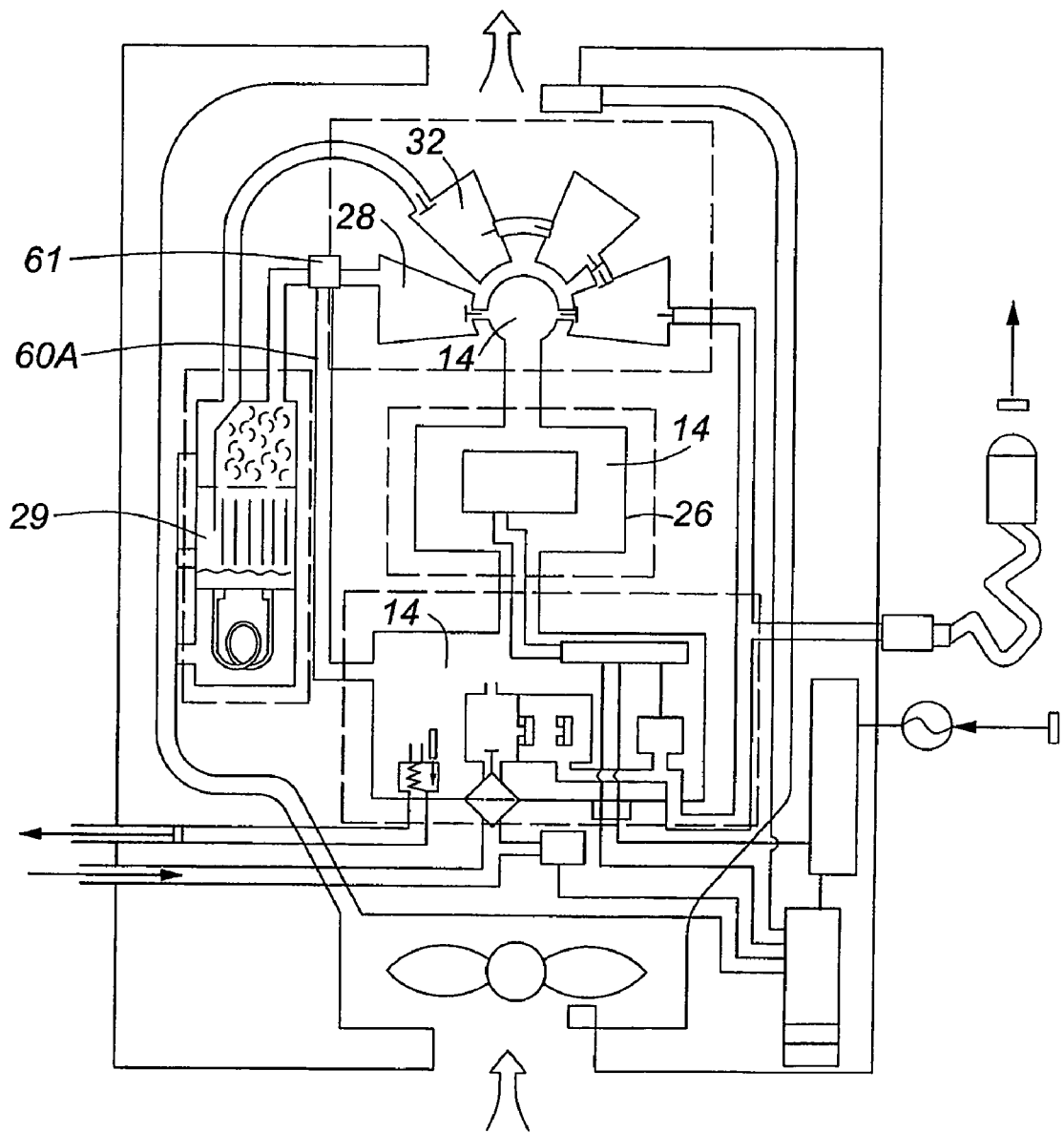

In FIGS. 8A and 8B a fixed speed motor variant is shown wherein a bypass line 60 or 60A is opened by valve 61 actuated by the main logic controller 46 during regeneration. Due to this bypass, the sweep gas 13 passes through the desiccant material 7 and condenser 30 at a preferred flow rate. The amount of sweep gas 13 allowed by valve 61 and associated flow-limiting means to pass through this regeneration branch is set to maximize the efficiency of the vapor evaporation and condensation process. Recirculating gas 13 is either diverted to the second stage 32 through bypass line 60, or to the casing volume 14 through bypass line 60A, or both bypass lines may be used in combination.

Referring to FIG. 2, the compressor 5, motor 27 and motor control circuitry 45 are all located within the casing 26, (counting the compressor block as part of the casing), which is in turn, surrounded by an outer shroud 43. According to one variant of the invention the electronic motor controller 45, which supplies current to the electrical motor 27, is preferably located within the totally contained environment of the motor/compressor assembly. This sealed environment is provided by the same metal casing 26 that surrounds the motor and compressor parts. The motor control circuitry 45 is, in particular, located in the blow-down volume 14, sealed entirely within the casing 26. The metallic wall of the casing 26 acts as heat sink for the heat produced by the motor control circuitry 45 and as a shield for outgoing electromagnetic emissions arising from wiring extending between the motor 27 and motor controller 45.

As shown in FIG. 2, the main logic controller 46, fed power from a power supply 47, is able to activate the motor 27, and govern its speed in the variable speed version, through motor control circuitry 45. Signals between the main logic controller 46 and motor control circuitry 45 penetrate the casing 26 at a sealed entry point 44. The command logic circuitry 46 sends and receives commands and data through digitally encoded signals transmitted along optical fibers. This minimizes the electrical penetrations made into the interior 14 of the metal cavity of the casing 26 which contains natural gas in a slightly pressurized condition.

CONCLUSION

The above disclosed embodiments are only exemplary. The invention in its broadest, and more specific aspects, is further described and defined in the claims which now follow.

These claims, and the language used therein, are to be understood in terms of the variants of the invention which have been described. They are not to be restricted to such variants, but are to be read as covering the full scope of the invention as is implicit within the invention and the disclosure that has been provided herein.

The embodiments of the invention in which an exclusive property or privilege is claimed are defined as follows:

1. A compressor system for gas supplied by a gas supply inlet which normally operates on a gas compression cycle but which also operates in a drier regeneration cycle, said system comprising:
   1) a compressor driven by a motor, the compressor having at least a first stage inlet through which passes a flow of gas being compressed from a gas supply inlet;
   2) a gas delivery outlet at the outlet of the compressor, for supplying gas to a delivery line;
   3) a gas drier stage comprising a desiccant bed located in-line with the flow of gas passing through the compressor during the gas compression cycle;
   4) a condenser also located in-line with the flow of gas passing through the compressor during the gas compression cycle, which condenser, during the compression cycle, is normally inactive;
   5) temperature control means to control the temperatures of the desiccant bed and condenser which means are, during the compression cycle, inactive but, upon entering into a regeneration cycle, such means being actuatable to cause the desiccant bed to be heated and the condenser to be cooled;
   6) valve means for switching the flow of gas from the delivery line to recirculate through the compressor, whereby, during the regeneration cycle arising from activation of the valve means, gas trapped within the compressor, desiccant bed and condenser is redirected from the outlet of the compressor for circulation in a closed loop as a recirculating gas flow through the compressor, with at least a portion of such recirculating gas flow passing through the desiccant bed and condenser to permit water evolved from the desiccant bed to be carried by the recirculating gas to the condenser where it condenses due to the low temperature condition maintained within the condenser by the temperature control means; and
   7) wherein the compressor comprises a sealed casing with an interior volume connected to said gas supply inlet and to the first stage compressor inlet, said valve means further comprising
      a supply valve at said gas supply inlet that closes when the valve means switches the flow of gas to recirculate through the compressor casing and opens when compressed gas is passing to the delivery line, whereby, in accordance with the state of activation of the valve means, gas within the interior volume of the casing may be drawn-in by the first stage compressor from either said gas supply inlet or from said compressor outlet.

2. A compressor system as in claim 1 wherein the compressor is a multi-stage compressor having at least first and second stages, and the desiccant bed and condenser are positioned in-line between the first and second stages of the compressor.

3. A compressor system as in claim 2 wherein the condenser produces water as a condensate and further comprising a semi-permeable membrane through which condensed water is allowed to evaporate into the environment.

4. A compressor system as in claim 3 wherein the membrane is in the form of tubing filled by gravity.

5. A compressor system as in claim 1 comprising a main logic controller connected to motor control circuitry to effect variable speed operation of the motor for operating the motor and compressor at a reduced speed, said speed being adjusted during regeneration so that the flow of recirculating gas passing through the condenser is limited, permitting such gas flow to be chilled when it exits the condenser whereby the transfer of moisture from the desiccant bed to the condenser is effected.

6. A compressor system as in claim 5 wherein the motor is an alternating current induction motor, and the motor control circuitry produces an alternating current signal of varying frequency, whereby the speed of the motor is varied in accordance with such varying frequency.

7. A compressor system as in claim 1 comprising a main logic controller connected to a bypass valve on a bypass line that diverts recirculating gas from passing through said desiccant bed and condenser so that, during regeneration, the flow of recirculating gas passing through the condenser is limited, permitting such gas flow to be chilled when it exits the condenser whereby the transfer of moisture from the desiccant bed to the condenser is effected.

8. A compressor system as in claim 1 comprising motor control circuitry located within the casing for delivering of current to the motor, said motor control circuitry being connected to said motor through wiring that is shielded by said casing whereby electromagnetic emissions arising from current being delivered from the motor controller to the motor are not transmitted outside the metal casing.

9. A compressor system for gas comprising:
   1) a compressor having at least a first stage inlet for receiving a flow of gas from a gas supply inlet to be compressed;
   2) a motor connected to drive said compressor;
   3) a gas delivery outlet at the outlet of the compressor, for supplying gas to a delivery line;
   4) a sealed casing enclosing the motor,
   5) motor control circuitry for delivering current to the motor, said motor control circuitry being connected to said motor through wiring that is shielded, whereby electromagnetic emissions arising from current being delivered from the motor controller to the motor are not transmitted outside the metal casing; and
   6) wherein said sealed casing defines an interior volume connected to said gas supply inlet and to the first stage compressor inlet line that diverts recirculating gas from passing through said desiccant bed and condenser so that, during regeneration, the flow of recirculating gas passing through the condenser is limited, permitting such gas flow to be chilled when it exits the condenser whereby transfer of moisture from the desiccant bed to the condenser is effected.

10. A compressor system as in claim 9 wherein the motor control circuitry operates to create an alternating current having multiple harmonics.

11. The compressor system of claim 9 wherein the casing comprises metal and the motor control circuitry and the wiring are located within the casing, said metal casing reducing electromagnetic emissions to the casing exterior from either of the motor control circuitry and the wiring.

* * * * *

UNITED STATES PATENT AND TRADEMARK OFFICE
CERTIFICATE OF CORRECTION

| | | |
|---|---|---|
| PATENT NO. | : 8,016,570 B2 | Page 1 of 1 |
| APPLICATION NO. | : 10/530247 | |
| DATED | : September 13, 2011 | |
| INVENTOR(S) | : Chan et al. | |

It is certified that error appears in the above-identified patent and that said Letters Patent is hereby corrected as shown below:

On the title page of the patent, add:
--Related US Application Data
Continuation-in-part of application Ser. No. 10/265,096, filed October 4, 2002, now Pat. No. 7,011,118.--

Signed and Sealed this
Twenty-ninth Day of November, 2011

David J. Kappos
*Director of the United States Patent and Trademark Office*